United States Patent
Aqlan et al.

(10) Patent No.: US 9,910,427 B2
(45) Date of Patent: Mar. 6, 2018

(54) PERFORMING HIERARCHICAL DATA-DRIVEN INVENTORY AND WAREHOUSE MANAGEMENT IN MANUFACTURING ENVIRONMENTS

(71) Applicant: INTERNATIONAL BUSINESS MACHINES CORPORATION, Armonk, NY (US)

(72) Inventors: Faisal Aqlan, Poughkeepsie, NY (US); Warren Boldrin, Montgomery, NY (US); Sreekanth Ramakrishnan, Salem, MA (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 14/474,483

(22) Filed: Sep. 2, 2014

(65) Prior Publication Data

US 2016/0062347 A1 Mar. 3, 2016

(51) Int. Cl.
- *G06Q 10/00* (2012.01)
- *G05B 19/418* (2006.01)
- *G06Q 10/08* (2012.01)
- *G06Q 10/10* (2012.01)
- *G06F 17/00* (2006.01)

(52) U.S. Cl.
CPC ......... *G05B 19/418* (2013.01); *G06Q 10/087* (2013.01); *G06F 17/00* (2013.01); *G06Q 10/00* (2013.01); *G06Q 10/10* (2013.01); *Y02P 90/20* (2015.11)

(58) Field of Classification Search
CPC ..................... G06Q 10/00–10/10; G06F 17/00
USPC ............ 705/7.31, 22, 7.25, 28, 26.1, 5, 338
See application file for complete search history.

(56) References Cited

U.S. PATENT DOCUMENTS

| | | | | |
|---|---|---|---|---|
| 5,630,070 A | * | 5/1997 | Dietrich | G06Q 10/06 705/7.12 |
| 6,341,269 B1 | | 1/2002 | Dulaney et al. | |
| 6,341,271 B1 | * | 1/2002 | Salvo | G06Q 10/087 705/28 |
| 6,970,841 B1 | * | 11/2005 | Cheng | G06Q 10/0631 705/22 |

(Continued)

OTHER PUBLICATIONS

Jae Hun Kang et al., "Inventory control in a two-level supply chain with risk pooling effect", International Journal of Production Economics, 2012, pp. 116-124, Elsevier.

*Primary Examiner* — Olusegun Goyea
(74) *Attorney, Agent, or Firm* — Yudell Isidore PLLC

(57) ABSTRACT

A method, data processing system and computer program product for managing inventory used in a manufacturing operation to manufacture a product. The method includes a processor communicating with at least one database containing manufacturing operation data. Several inventory locations and components are identified within the manufacturing operation data. A current component inventory and space data, historical component usage data and a demand forecast are retrieved. A statistical analysis is performed upon the current component inventory and space data, the historical component usage data and the demand forecast to obtain a target inventory level range for each of the components at each of the inventory locations. An inventory level control chart is generated, based on the statistical analysis, for selected components associated with at least one inventory location.

20 Claims, 10 Drawing Sheets

(56) References Cited

U.S. PATENT DOCUMENTS

| | | | | |
|---|---|---|---|---|
| 7,092,929 B1* | 8/2006 | Dvorak | G06Q 10/087 | 705/28 |
| 7,249,068 B1* | 7/2007 | Kakouros | G06Q 10/087 | 705/26.1 |
| 2002/0138336 A1* | 9/2002 | Bakes | G06Q 10/087 | 705/28 |
| 2002/0198794 A1* | 12/2002 | Williams | G06Q 10/06 | 705/28 |
| 2003/0101107 A1* | 5/2003 | Agarwal | G06Q 10/087 | 705/28 |
| 2003/0229550 A1* | 12/2003 | DiPrima | G06Q 10/087 | 705/28 |
| 2005/0075949 A1* | 4/2005 | Uhrig | G06Q 10/087 | 705/28 |
| 2006/0020485 A1* | 1/2006 | Schierholt | G06Q 10/0631 | 705/7.12 |
| 2007/0156543 A1* | 7/2007 | Klim | G06Q 10/06 | 705/28 |
| 2008/0177599 A1* | 7/2008 | McPhetrige | G06Q 10/087 | 705/7.31 |
| 2009/0182590 A1* | 7/2009 | Ashby | G06Q 10/02 | 705/5 |
| 2010/0125486 A1* | 5/2010 | Sinclair | G06Q 10/08 | 705/7.31 |
| 2011/0191139 A1* | 8/2011 | Hong | G06Q 10/087 | 705/7.31 |
| 2012/0004944 A1* | 1/2012 | Bachman | G06Q 10/06315 | 705/7.25 |
| 2012/0011139 A1* | 1/2012 | Drissi | G06F 17/30427 | 707/760 |
| 2013/0246228 A1* | 9/2013 | Xing | G06Q 10/087 | 705/28 |
| 2013/0310967 A1 | 11/2013 | Olson et al. | | |
| 2014/0156348 A1* | 6/2014 | Sinkel | G06Q 30/0605 | 705/7.31 |

* cited by examiner

314 →

| Location 400 | Component Part Number 512 | Component Description 514 | Quantity 516 | Test Status 518 | Square Feet 520 |
|---|---|---|---|---|---|
| A | 85415 | Untested Modules | 89 | No | 21 |
| B | 23580 | PCB Sub-Assembly | 240 | No | 5 |
| C | 19852 | Untested Memory | 736 | No | 4 |
| D | 14582 | Final PCB Assembly | 214 | No | 14 |
| E | 73258 | Untested Node | 1204 | No | 8 |
| F | 54176 | Tested Node | 523 | Yes | 2 |
| G | 65910 | Tested Node with Memory | 382 | Yes | 6 |
| H | 65910 | Tested Node without Memory | 77 | Yes | 13 |

FIG. 5

PERFORMING HIERARCHICAL DATA-DRIVEN INVENTORY AND WAREHOUSE MANAGEMENT IN MANUFACTURING ENVIRONMENTS

BACKGROUND

1. Technical Field

The present invention generally relates to the computer-based management of inventory. More specifically, the present invention relates to a method and system for hierarchical data-driven inventory and warehouse management for manufacturing environments.

2. Description of the Related Art

Manufacturing operations may use hundreds or thousands of components to build various manufactured goods. The manufacturing operations may include several sub-assemblies that are built at one or more separate manufacturing plants in different locations. Each good or sub-assembly can include a number of components such as individual parts or sub-assemblies. In order for the manufacturing operations to operate without interruption, sufficient quantities of components are required to be kept in inventory for each manufactured item at each manufacturing location.

Inventory management in build-to-order environments for servers, computers and computer components is important due to several factors, such as the use of expensive components with high inventory holding cost, the extensive testing processes of servers and computers, the long lead time for test processes, and the fluctuation of customer demand. Keeping sufficient quantities of components available can entail significant challenges and risks. For example, if too many components are maintained in inventory, excess capital can be used in infrequently used components, such as rarely-needed or obsolete components. If insufficient quantities of components are maintained in inventory, the manufacturing operation risks disruption in operations which result in lost production and increased costs. Excess inventory of components results in high inventory holding cost. Furthermore, the inefficient management of the space holding the components results in low space utilization and increased cost.

BRIEF SUMMARY

Disclosed are a method, a data processing system and a computer program product for managing inventory used in a manufacturing operation to manufacture a product.

The method includes a processor communicating with at least one database containing manufacturing operation data about the product and importing the manufacturing operation data to a storage device. Several inventory locations associated with the manufacturing operation are identified within the manufacturing operation data. Several components stored at each of the inventory locations that are used in manufacturing the product are identified within the manufacturing operation data. A current component inventory and space data are retrieved from the manufacturing operation data. The current component inventory and space data contain a current inventory quantity and space occupied for each of the components at each of the inventory locations. Historical component usage data is retrieved from the manufacturing operation data. The historical component usage data indicates a magnitude of a historical consumption of the component during a time period for each of the components at each of the inventory locations. A demand forecast for the components is retrieved. The demand forecast indicates a magnitude of future demand for the components during a future time period. A statistical analysis is performed on the current component inventory and space data, the historical component usage data and the demand forecast to obtain a target inventory level range for each of the components at each of the inventory locations. An inventory level control chart is generated, based on the statistical analysis, for at least one selected component associated with at least one inventory location.

The data processing system includes one or more processors operable to execute instructions which cause the processor to communicate with at least one database containing manufacturing operation data about the product and import the manufacturing operation data to a storage device. The processor identifies, within the manufacturing operation data, several inventory locations associated with the manufacturing operation and indentifies several components stored at each of the inventory locations that are used in manufacturing the product. A current component inventory and space data are retrieved from the manufacturing operation data. The current component inventory and space data contains a current inventory quantity and space occupied for each of the components at each of the inventory locations. The processor further retrieves a historical component usage data from the manufacturing operation data. The historical component usage data indicates a magnitude of historical consumption of the component during a first time period for each of the components at each of the inventory locations. A demand forecast for the components is retrieved. The demand forecast indicates a magnitude of future demand for the components during a future time period. A statistical analysis is performed upon the current component inventory and space data, the historical component usage data and the demand forecast to obtain a target inventory level range for each of the components at each of the inventory locations. The processor generates at least one inventory level control chart for at least one selected component associated with at least one inventory location.

The computer program product includes a computer readable storage device; and program code on the computer readable storage device that when executed within a data processing device provides the functionality of the above described method.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein:

FIG. 5 illustrates an example of current component inventory and space data, in accordance with one or more embodiments;

DETAILED DESCRIPTION

The illustrative embodiments provide a method, system and computer program product for managing inventory used in a manufacturing operation to manufacture a product. With the method, a processor communicates with at least one database containing manufacturing operation data about the product and imports the manufacturing operation data to a storage device. Several inventory locations associated with the manufacturing operation are identified within the manufacturing operation data. Several components stored at each of the inventory locations that are used in manufacturing the product are identified within the manufacturing operation data. A current component inventory and space data are retrieved from the manufacturing operation data. The current component inventory and space data contain a current inventory quantity and space occupied for each of the components at each of the inventory locations. Historical component usage data is retrieved from the manufacturing operation data. The historical component usage data indicates a magnitude of a historical consumption of the component during a time period for each of the components at each of the inventory locations. A demand forecast for the components is retrieved. The demand forecast indicates a magnitude of future demand for the components during a future time period. A statistical analysis is performed on the current component inventory and space data, the historical component usage data and the demand forecast to obtain a target inventory level range for each of the components at each of the inventory locations. An inventory level control chart is generated, based on the statistical analysis, for at least one selected component associated with at least one inventory location.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
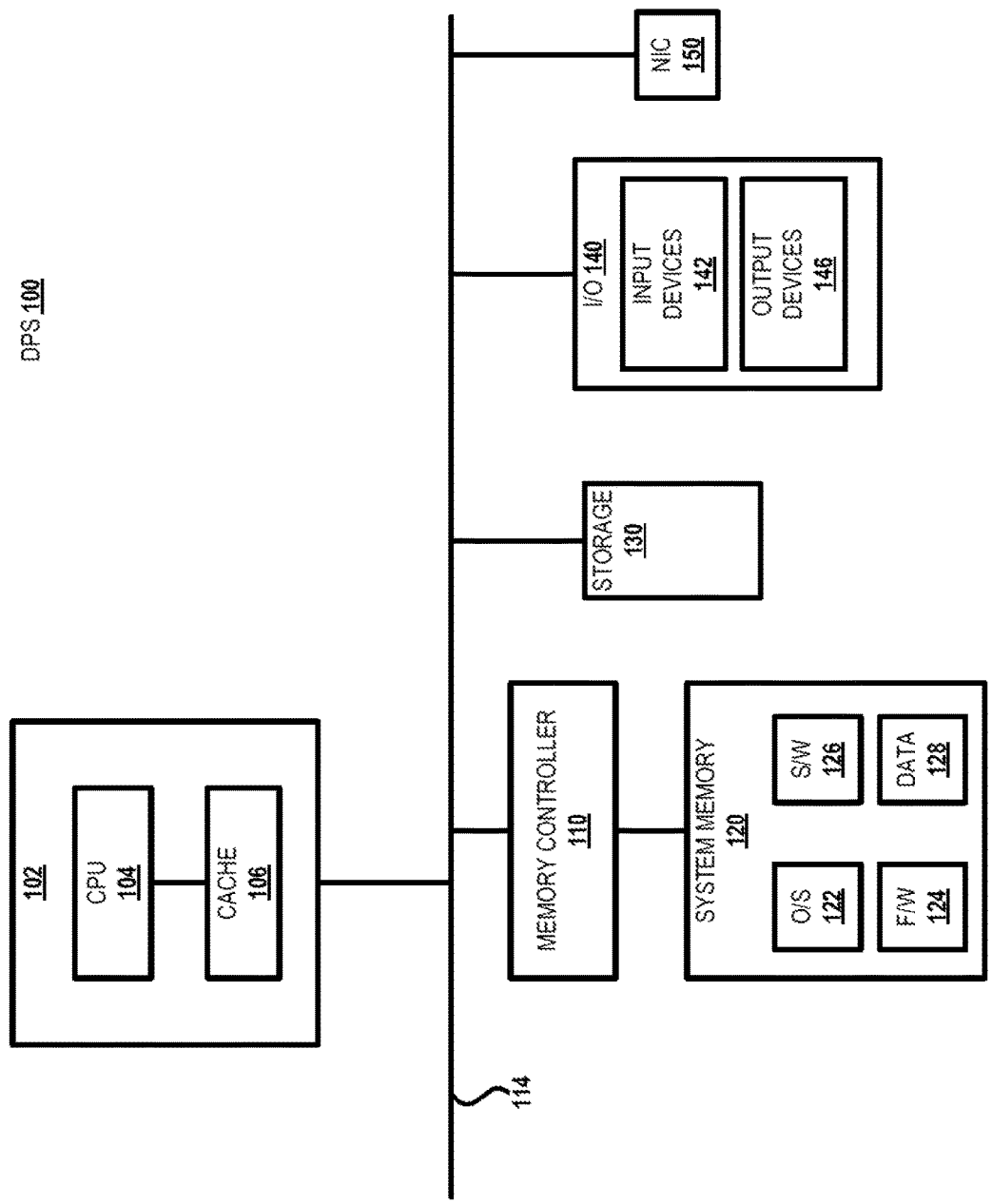
FIG. 1 provides a block diagram representation of an example data processing system within which one or more of the described embodiments can be practiced.

With reference now to the figures, and beginning with FIG. 1, there is depicted a block diagram representation of an example data processing system (DPS), as utilized within one embodiment. The data processing system can be described as having features common to a server computer. However, as used herein, the term "data processing system" is intended to include any type of computing device or machine that is capable of receiving, storing and running a software product and retrieving data/instructions from a storage device. Therefore the DPS can include not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a computer, those skilled in the art will recognize that embodiments may be implemented in a combination of program modules running in an operating system. Generally, program modules include routines, programs, components, and data structures, which perform particular tasks or implement particular abstract data types. The embodiments may also be practiced in distributed computing environments where tasks are performed by remote processing devices that are linked through a communications network. In a distributed computing environment, program modules may be located in both local and remote memory storage devices.

FIG. 1 illustrates an example DPS 100 that comprises one or more processor modules or processor(s) 102 that include one or more central processing units (CPUs), of which CPU 104 is illustrated. Throughout the description herein, the terms CPU and processor can be utilized interchangeably as referring to the same component. Processor 102 further includes cache subsystem 106. Cache subsystem 106 can comprise one or more levels of caches, such as an L1 cache and an L2 cache, and one or more of the lower levels of caches, which can be a shared cache. Processor 102 is coupled to a system interconnect fabric 114 that couples other components of DPS 100 to processor 102. Interconnect fabric 114 can be an address and data bus, in one embodiment.

System memory 120 is coupled to system interconnect fabric 114 via a memory controller 110. System memory 120 can include therein a plurality of modules and routines, including operating system (0/S) 122, firmware (F/W) 124, software (S/W) 126, and data 128. The various software and/or firmware modules have varying functionality when their corresponding program code is executed by CPU 104 within DPS 100.

DPS 100 can further include physical computer readable storage media 130 (or storage) such as hard disk drives. Storage media 130 can also include solid state storage devices, optical drives and other physical storage devices. DPS 100 can also include input/output devices and corresponding controllers, generally represented as I/O 140. I/O 140 can include input devices 142 such as a keyboard or mouse that allow a user to make selections and provide input to DPS 100. I/O 140 can further include output devices 146 such as a video display and speakers that provide output from DPS 100. DPS 100 also includes a network interface card (NIC) 150, among other components. NIC 150 enables DPS 100 to connect to and communicate with other remote devices and networks, such as a database system, for example.

Figure 2:
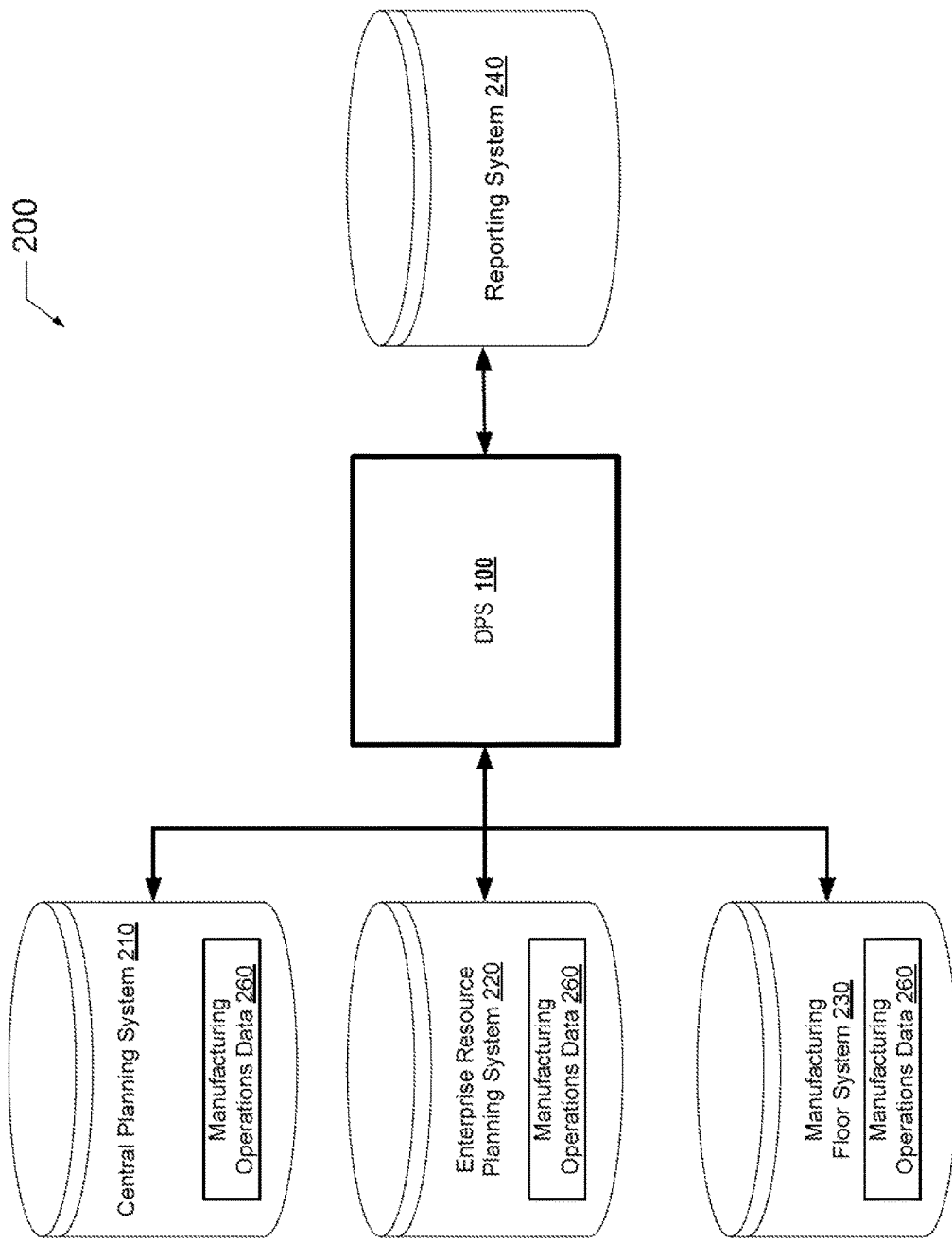
FIG. 2 provides a block diagram representation of an example database system in communication with the data processing system of FIG. 1 within which one or more of the described embodiments can be practiced.

Referring to FIG. 2, there is illustrated a database system 200 that is in communication with DPS 100. Database system 200 includes central planning system (CPS) 210, enterprise resource planning system (ERPS) 220, manufacturing floor system (MFS) 230 and reporting system (RS) 240. Each of these systems has corresponding data associated therewith. Each of CPS 210, ERPS 220, MFS 230 and RS 240 are in communication with DPS 100.

CPS 210 contains business management software and data that provides for centralized planning between various business functions. ERPS 220 contains business management software and data that provides an integrated view of core business processes. ERPS 220 tracks business resources such as cash, raw materials, production capacity and the status of business commitments: orders, purchase orders, and payroll. The applications that make up the system share data across various departments, such as manufacturing, purchasing, sales and accounting that provide the data. MFS 230 contains software and data for managing manufacturing operations for various products that are manufactured in several locations. RS 240 contains software and data for generating reports regarding business information for an organization.

Each of CPS 210, ERPS 220 and MFS 230 contain manufacturing operations data 260. Manufacturing operations data 260 can store a wide variety of data related to manufacturing a product and to manufacturing operations. In one embodiment, manufacturing operations data 260 can store inventory locations, inventory location data, inventory levels of components and sub-assemblies, demand data, historical component usage and component lead times.

Figure 3:
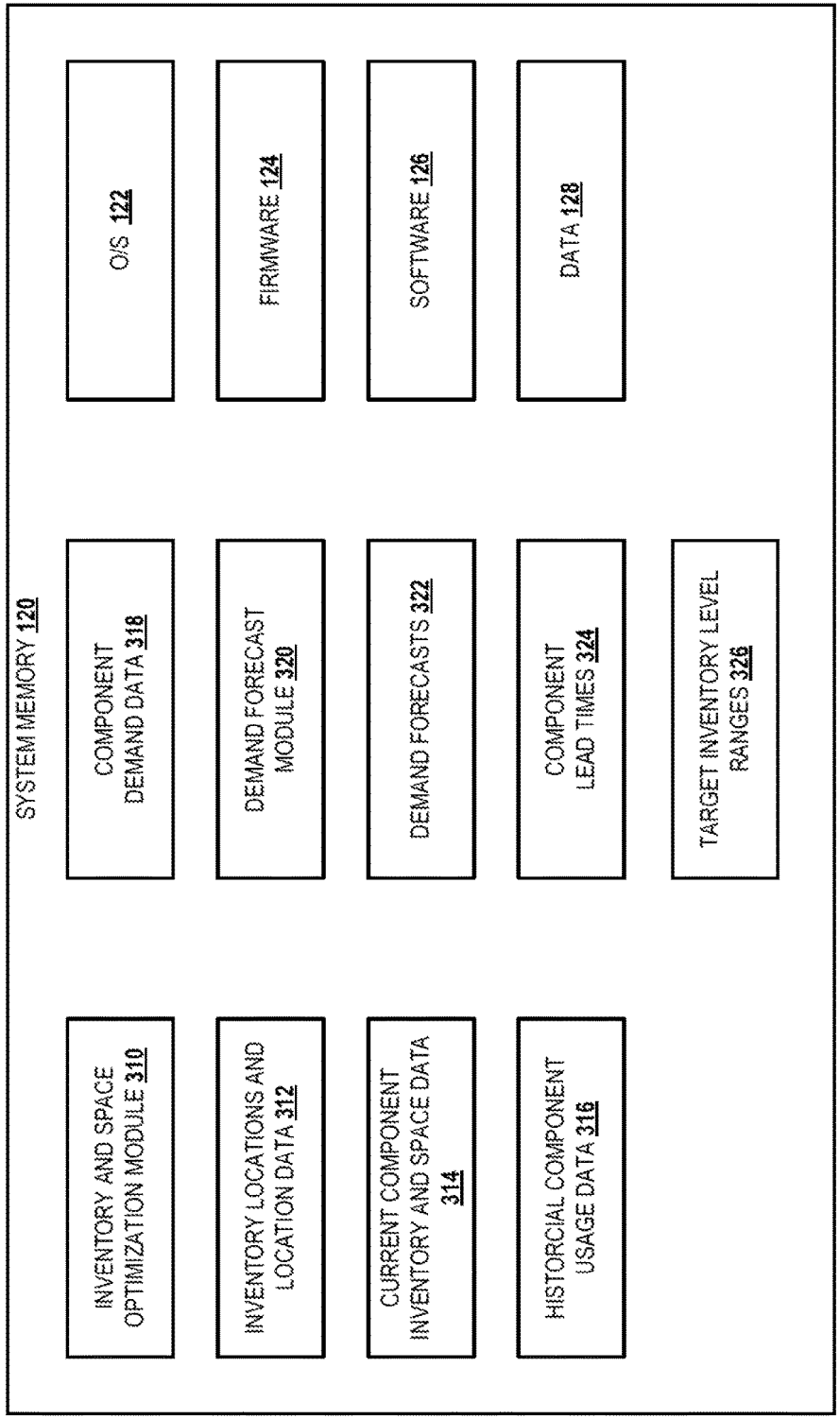
FIG. 3 illustrates a block diagram of functional components contained in an example memory system, in accordance with one or more embodiments.

With reference to FIG. 3, there is illustrated one embodiment of functional components contained within system memory 120. Operating system (O/S) 122, firmware (F/W) 124, software (S/W) 126 and data 128 can be stored in and retrieved from system memory 120 through the operation of read and write commands. Functions, modules, routines, methods and processes of the present disclosure can be provided as firmware code and/or logic stored on system memory 120 and executed on processor 102 (FIG. 1). System memory 120 includes an inventory and space optimization module 310 and a demand forecasting module 320. Inventory and space optimization module 310 is software/firmware code and logic that can manage inventory and warehouse space used in manufacturing operations to manufacture products. Demand forecasting module 320 generates demand forecasts 322 that are future projections of sales demand for one or more manufactured products.

System memory 120 further includes inventory locations and location data 312, current component inventory and space data 314, historical component usage data 316, current component demand data 318, component lead times 324 and target inventory level ranges 326. Inventory locations and location data 312 contains information regarding manufacturing locations where inventory is stored. Current component inventory and space data 314 contains information regarding the current component levels and amount of space the components currently occupy in the inventory locations. Historical component usage data 316 contains information regarding a past history of consumption during manufacturing of each component. Current product demand data 318 contains information regarding the current volume of demand for products manufactured by the manufacturing operation. Component lead times 324 contains information regarding the length of time to receive a component after an order is placed. Target inventory level ranges 326 are optimum ranges of inventory to be stored that both meet required component needs and minimize the cost of holding components.

In one embodiment, processor 102 communicates with databases 210, 220 and 230 that contain manufacturing operations data 260 and imports the manufacturing operations data 260 to a storage device such as system memory 120 (see FIGS. 1-2). Inventory locations associated with the manufacturing operation are identified within the manufacturing operation data 260. Components stored at each of the inventory locations are identified within the manufacturing operations data 260. Current component inventory and space data 314 are retrieved from the manufacturing operations data 260. The current component inventory and space data 314 contains a current inventory quantity and space occupied for each of the components at each of the inventory locations. Historical component usage data 316 is retrieved from the manufacturing operations data 260. The historical component usage data 316 indicates a magnitude of a historical consumption of the component during a time period for each of the components at each of the inventory locations. A demand forecast 322 for the components is also retrieved. The demand forecast 322 indicates a magnitude of future demand for the components during a future time period. A statistical analysis is performed upon the current component inventory and space data, the historical component usage data and the demand forecast to obtain a target inventory level range 326 for each of the components at each of the inventory locations. An inventory level control chart is generated, based on the statistical analysis, for at least one selected component associated with at least one inventory location.

Those of ordinary skill in the art will appreciate that the hardware and software components and basic configuration depicted in FIGS. 1-3 and described herein may vary. For example, the illustrative components within DPS 100 are not intended to be exhaustive, but rather are representative to highlight components that can be utilized to implement aspects of the present disclosure. Other devices/components may be used in addition to or in place of the hardware depicted. The depicted examples do not convey or imply any architectural or other limitations with respect to the presently described embodiments and/or the general disclosure. The example data processing systems depicted in FIG. 1 may be, for example, an IBM eServer pSeries system, a product of International Business Machines Corporation in Armonk, N.Y., running the Advanced Interactive Executive (AIX) Operating System (Trademark of IBM Corporation) or LINUX Operating System (Trademark of Linus Torvalds).

Figure 4:
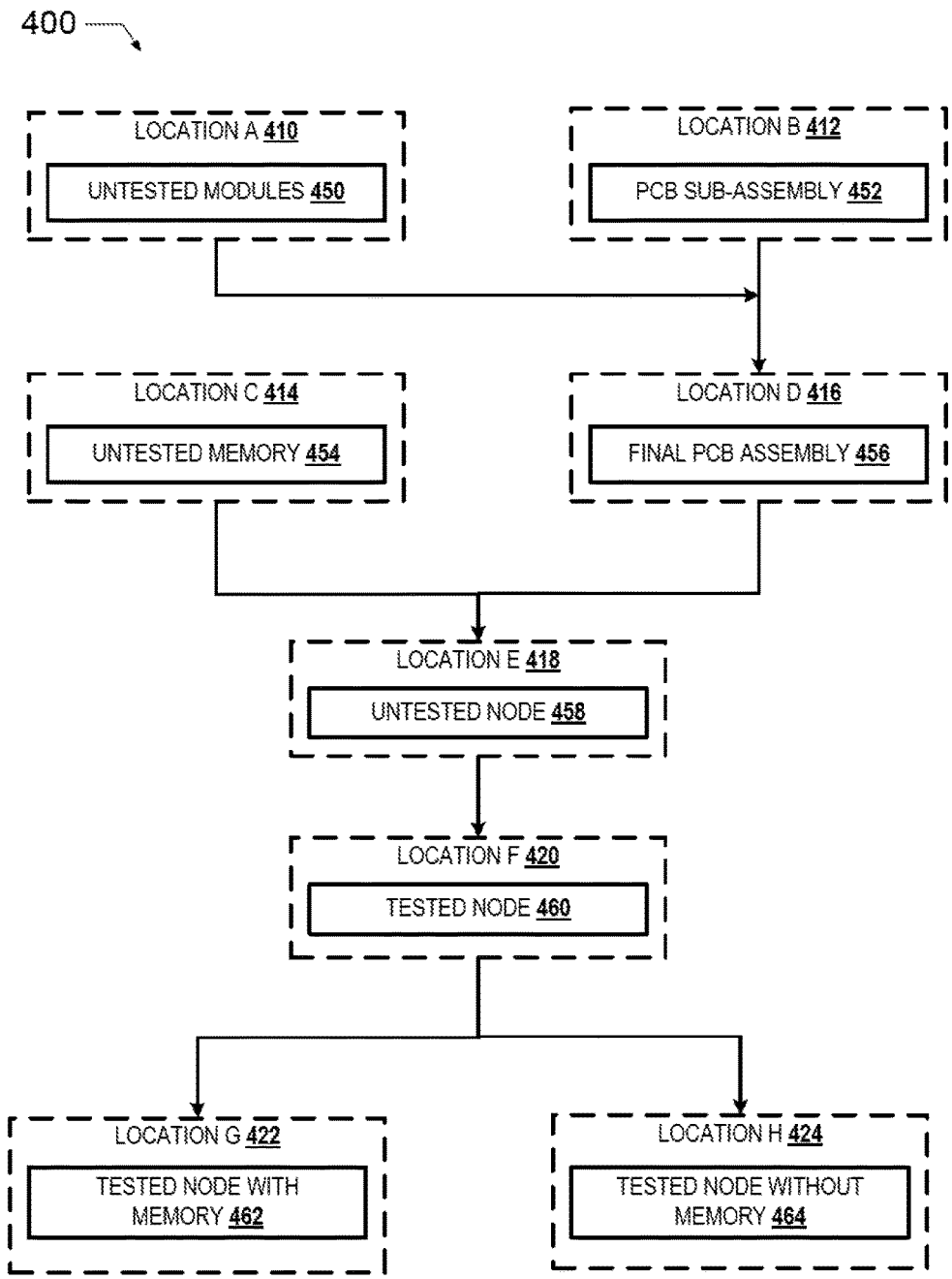
FIG. 4 illustrates an example of inventory locations associated with manufacturing a product having multiple manufacturing steps, in accordance with one or more embodiments.

FIG. 4 illustrates inventory locations 400 associated with manufacturing a product having multiple manufacturing steps. Each location can have an associated manufacturing operation or process that have interrelated manufacturing processes in order to build or assemble a product. Each of inventory locations 400 can have an inventory of components. In one embodiment, the manufacturing operation can assemble electronic devices such as computers or servers that use a variety of components. Inventory locations 400 include location A 410, location B 412, location C 414, location D 416, location E 418, location F 420, location G 422 and location H 424.

At location A 410, components such as untested modules 450 are stored. In one embodiment, untested modules 450 can be an electronic module such as a power supply or a graphics processing module. At location B 412, components such as printed circuit board (PCB) sub-assemblies 452 are stored. PCB sub-assemblies 452 can be circuit boards with or without components. Components such as untested memory devices 454 are stored at location C 414. The untested memory devices 454 can be dynamic random access memory chips. Final PCB assemblies 456 are stored at location D 416. Untested modules 450 are inserted into printed circuit board (PCB) sub-assemblies 452 forming final PCB assemblies 456. At location E 418, some final PCB assemblies 456 are assembled with untested memory 454 to form an untested node 458. In one embodiment, untested node 458 can be a computer or server. Some final PCB assemblies 456 at location E may remain unassembled from untested memory 454. At location F 420, the untested node 458 is tested and, after testing has passed, the previous untested node 458 is referred to as a tested node 460. At location G 422 tested nodes with memory 462 are stored. At location H 424, tested nodes without memory 464 are stored.

FIG. 5 illustrates example contents of current component inventory and space data 314. Current component inventory and space data 314 comprises inventory locations A-H 400, component part numbers 512, component description 514, quantity 516, test status 518 and the square feet 520. Inventory locations A-H 400 correspond to inventory locations 410-424 of FIG. 4. Component part numbers 512 are the part number associated with each component or sub-assembly in inventory. Component description 514 describes the components or sub-assemblies stored in inventory. Quantity 516 is the number or level of each component in inventory. Test status 518 describes whether the component or sub-assembly has been tested. Square feet 520 are the number of square feet of floor space that the components or sub-assemblies occupy during storage.

Figure 6:
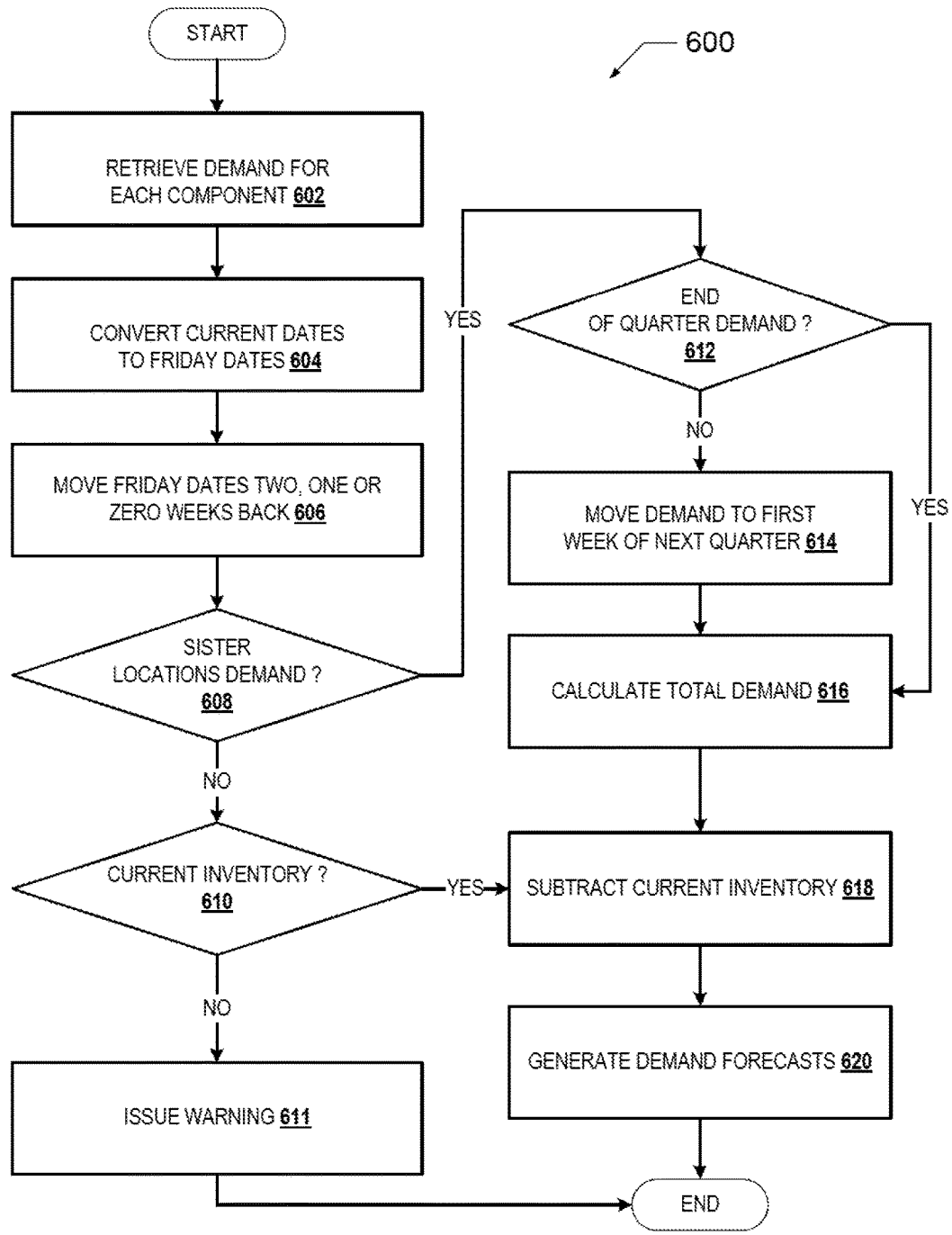
FIG. 6 is a flow chart illustrating one example of a method of forecasting demand for components used in a manufacturing operation, in accordance with one or more embodiments.
Figure 7:
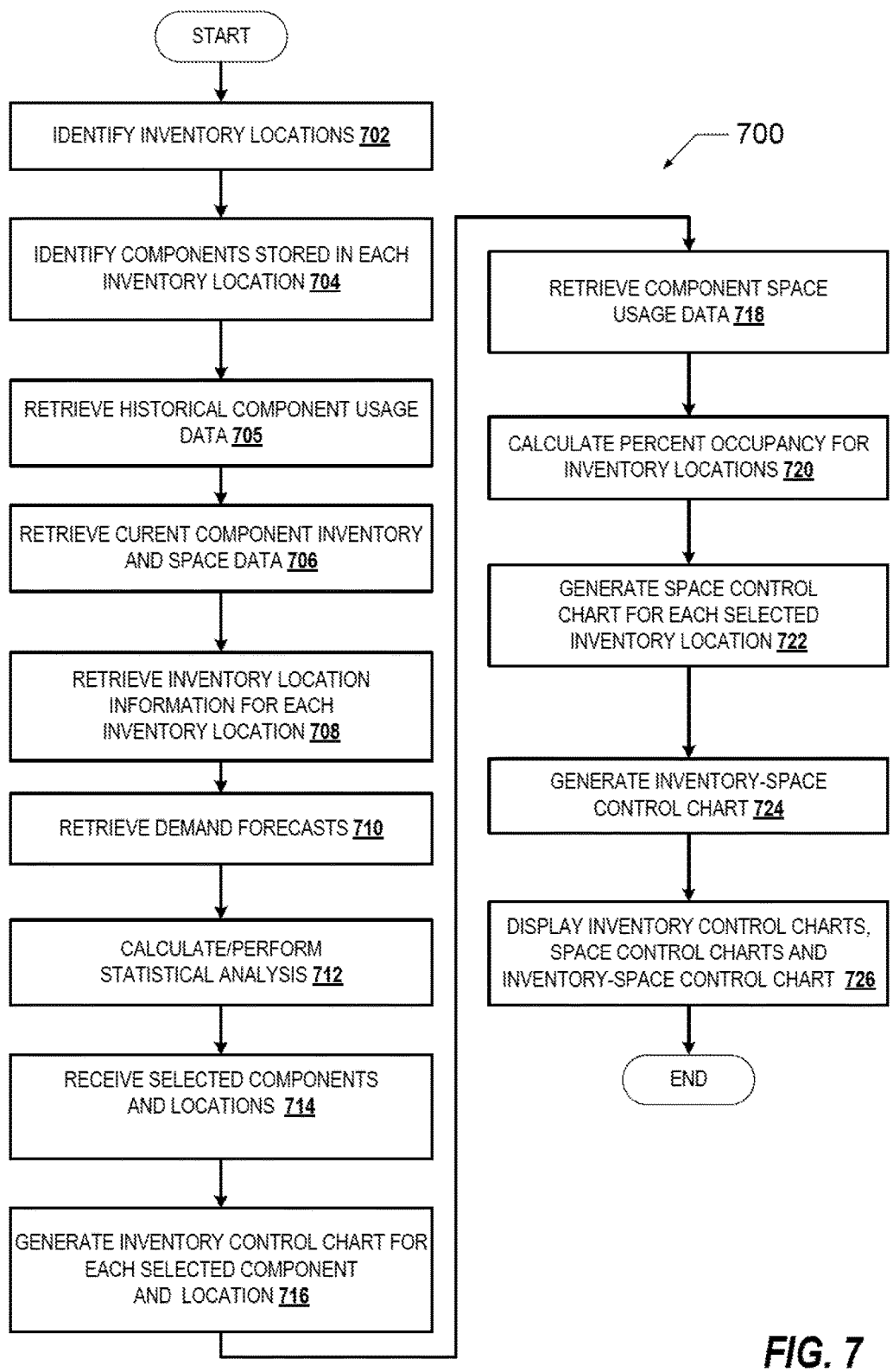
FIG. 7 is a flow chart illustrating one example of a method of managing component inventory and space in a manufacturing environment, in accordance with one or more embodiments.

FIGS. 6 and 7 illustrate flowcharts of exemplary processes for managing inventory used in a manufacturing operation to manufacture a product. Computer implemented methods 600 and 700 can be implemented in DPS 100. The description of the method is provided with general reference to the specific components illustrated within the preceding figures. In the discussion of FIGS. 6 and 7, reference is also made to elements described in FIGS. 1-5. Generally the methods are described as being implemented via processor 102 and particularly the execution of code provided by inventory and space optimization module 310 and demand forecasting module 320 within processor 102. It is however appreciated that certain aspects of the described methods may be implemented via other processing devices and/or execution of other code.

Turning to FIG. 6, there is provided a method 600 for forecasting demand for components used in a manufacturing operation. Method 600 begins at the start block and proceeds to block 602 where processor 102 retrieves current component demand data 318 for each component. In the embodiment presented by method 600, current dates of a week are converted to a pre-determined future date for a time period of interest. In one embodiment, processor 102 converts the current dates of a week to the next Friday date for a time period of interest to generate the demand forecast (block 604) and moves the Friday dates two, one or zero weeks back (block 606). Processor 102 determines if sister locations or other inventory locations 400 have a demand for the components (decision block 608). The demand from other inventory locations 400 is determined by analysis of historical component usage data 316 obtained from manufacturing operations data 260 stored in central planning system database 210. In response to other inventory locations 400 not having a demand for the components, processor 102 determines if the demanded components are currently in inventory and the quantity of the components in inventory at each inventory location (i.e., current component inventory and space data 314) at decision block 610. In response to the demanded components not being in inventory, processor 102 issues a warning 611 alerting an operator that the demanded components are not in inventory. Method 600 then ends. In response to the demanded components being in inventory, processor 102 subtracts the current inventory of the current component inventory and space data 314 from the current component demand data 318 for each component (block 618). Processor 102 generates or calculates demand forecasts 322 for each of the components at each of the inventory locations (block 620). The demand forecasts 322 for each component are calculated based on the current component demand added to the sister location component demand and subtracting the current component inventory for each component. Method 600 then terminates.

In response to determining at decision block 608 that other inventory locations 400 have a demand for the components, processor 102 determines if the time period of interest includes weeks that occur at the end of a quarterly reporting period (decision block 612). In response to the time period of interest including weeks that occur at the end of a quarterly reporting period, processor 102 moves current demand for the component to the first week of the next quarterly reporting period (block 614). Processor 102 calculates a total demand for each of the components for the time period of interest (block 616). In response to the time period of interest not including weeks that occur at the end of a quarterly reporting period, processor 102 also calculates a total demand for each of the components for the time period of interest (block 616). Processor 102 subtracts the current component inventory 314 from the calculated total demand for each component (block 618). Processor 102 generates or calculates demand forecasts 322 for each of the components at each of the inventory locations (block 620). Method 600 then ends.

FIG. 7 illustrates a flow chart of an exemplary method 700 for managing component inventory and space in a manufacturing environment. Method 700 begins at the start block and proceeds to block 702 where processor 102 identifies, within the manufacturing operations data 260, several inventory locations 400 associated with the manufacturing operation. Processor 102 also identifies several components 514 stored at each of the inventory locations 400 (block 704) that are used in manufacturing the product. Processor 102 retrieves historical component usage data 316 from the manufacturing operation data 260 (block 705). The historical component usage data 316 indicates a magnitude of historical consumption of the components during a first time period for each of the components at each of the inventory locations 400. Processor 102 retrieves current component inventory and space data 314 from the manufacturing operations data 260 (block 706). The current component inventory and space data 314 contains a current inventory quantity and space occupied for each of the components at each of the inventory locations 400. Processor 102 retrieves inventory locations and location data 312 from the manufacturing operations data 260 (block 708). The inventory locations and location data 312 contains information regarding the type of space, space occupied and space available at each inventory location 400. Processor 102 retrieves demand forecasts 322 (block 710) that were generated using demand forecast module 320 and method 600. Demand forecasts 322 indicate a magnitude of future demand for the components during a future time period.

At block 712, processor 102 calculates/performs a statistical analysis on the current component inventory and space data 314, the historical component usage data 316 and the demand forecasts 322 to obtain target inventory level ranges 326 for each of the components at each of the inventory locations. Processor 102 receives selected components and inventory locations that have been selected by a user (block 714). The user can select one or more components 514 and one or more inventory locations 400 of interest using an input device 142. At block 716, processor 102 generates inventory level control charts 800 (FIG. 8) based on the target inventory level ranges 326 for the selected components and inventory locations selected by the user.

Processor 102 retrieves component space usage data for each component from the manufacturing operations data 260 (block 718) and calculates a percent occupancy for each inventory location 400 based on the inventory location information and the component space usage data (block 720). Processor 102 generates at least one space control chart 900 (FIG. 9) for selected inventory locations based on the percent occupancy (block 722). Processor 102 generates at least one inventory and space relationship chart 1000 (FIG. 10) for each of the selected components and inventory locations (block 724). The inventory and space relationship chart 1000 is based on the associated inventory level control chart 800 and associated space control chart 900. At block 726, processor 102 displays the inventory level control chart 800, the space control chart 900, and the inventory and space relationship chart 1000 on an output device 146 such as a video display or monitor, where the charts 800, 900, and 1000 can be viewed by a user. Method 700 then ends.

Figure 8:
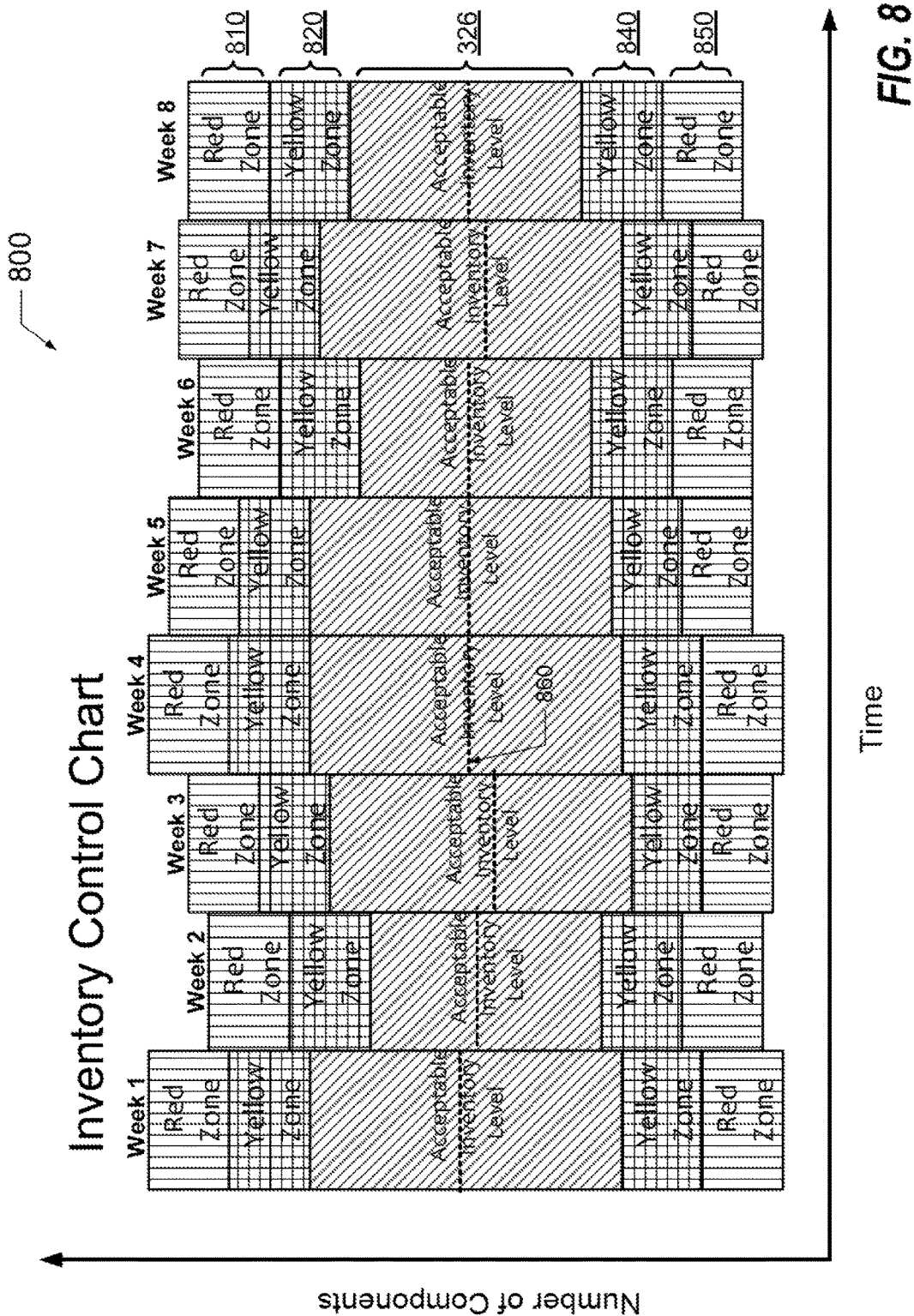
FIG. 8 illustrates an example of an inventory control chart, in accordance with one or more embodiments.

FIG. 8 illustrates an example inventory control chart 800. Inventory control chart 800 is a plot of the number of specific components at an inventory location for several pre-determined time periods. In inventory control chart 800, the time periods are in weeks. Inventory control chart 800 includes target inventory level ranges 326 that each has a mean inventory level 860. The mean inventory level 860 is the current calculated inventory level. Inventory control chart 800 further includes a first upper control limit zone (UCLZ) 810, a second UCLZ 820, a first lower control limit zone (LCLZ) 850 and a second LCLZ 840. Each of the control limit zones is calculated based on the mean inventory level (X), the mean demand GO, the standard deviation of the mean demand (σ) and the net lead time (NLT). The net lead time is the difference between the time an inventory location takes to fulfill an order and the response time promised to a downstream location.

The formulas to compute the control zones are:

$$UCLZ810 = X \leq \mu \times NLT + 3\sigma\sqrt{NLT}$$

$$UCLZ820 = \mu \times NLT + \sigma\sqrt{NLT} \leq X \leq \mu \times NLT + 2\sigma\sqrt{NLT}$$

$$LCLZ850 = X \leq \mu \times NLT - 3\sigma\sqrt{NLT}$$

$$LCLZ840 = \mu \times NLT - \sigma\sqrt{NLT} \leq X \leq \mu \times NLT - 2\sigma\sqrt{NLT}$$

An operator or user can view inventory control chart 800 and make inventory decisions based on target inventory level ranges 326, UCLZ 810, UCLZ 820, LCLZ 850 and LCLZ 840.

Figure 9:
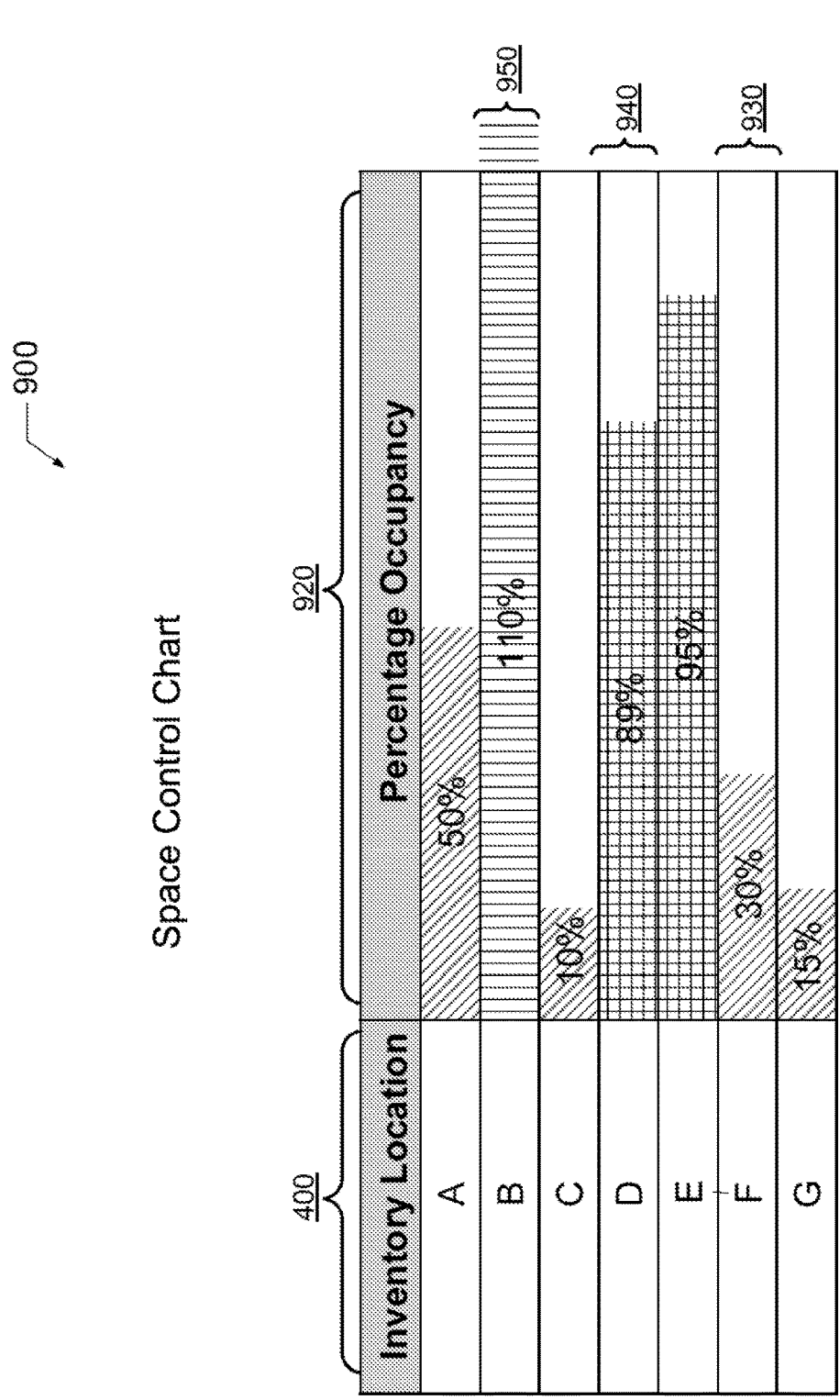
FIG. 9 illustrates an example of a space control chart, in accordance with one or more embodiments.

FIG. 9 illustrates an example space control chart 900. Space control chart 900 is a table of inventory locations 400 and the percent occupancy 920 at each inventory location. The percent occupancy 920 is the percentage of the total space in the inventory location that is occupied by all of the components stored in that location. Space control chart 900, includes locations that have 0 to 80 percent occupancy 930, 80 to 100 percent occupancy 940 and more than 100 percent occupancy 950. In space control chart 900, location B is shown as having 110% occupancy, which means that the components to be stored in that location take up more space than is available for storage.

Figure 10:
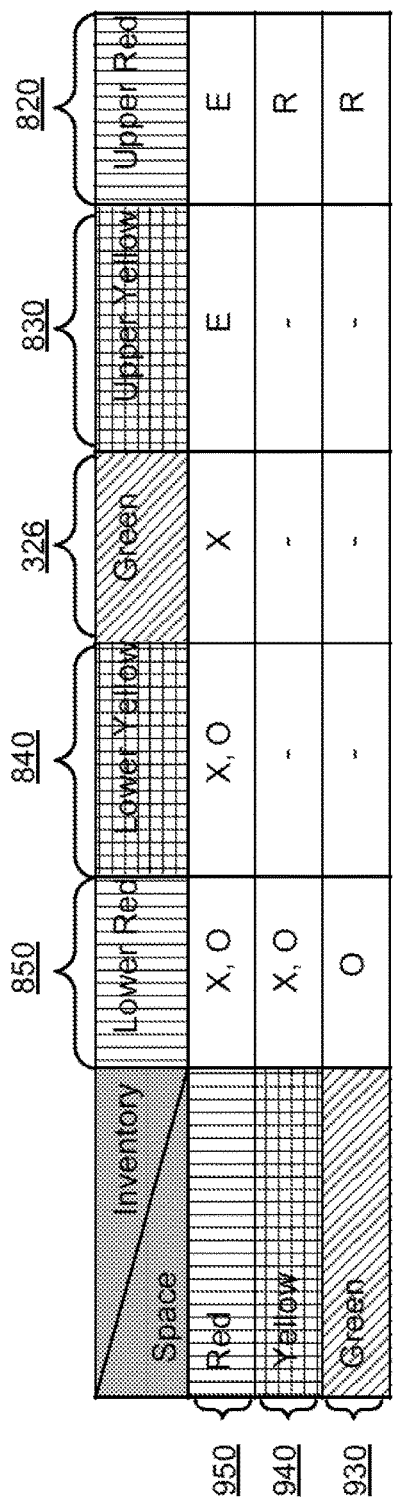
FIG. 10 illustrates an example of an inventory-space relationship chart, in accordance with one or more embodiments.

FIG. 10 illustrates an example of inventory-space relationship chart 1000. Inventory-space relationship chart 1000 is a chart of the space classifications (0-80% occupancy 930, 80-100% occupancy 940, and more than 100% occupancy 950) versus the inventory classifications (inventory level ranges 326, UCLZ 810, UCLZ 820, LCLZ 850 and LCLZ 840 of FIG. 8). In inventory-space relationship chart 1000, boxes labeled with an X indicate that additional space is needed to store the components at the corresponding inventory location. Boxes labeled with an O indicate that additional inventory of the components are needed at the corresponding inventory location. Boxes labeled with an E indicate that either inventory of the components needs to be reduced or that extra space is needed at the corresponding inventory location. Boxes labeled with an R indicate that inventory needs to be reduced at the corresponding inventory location.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   a processor of a data processing system, communicating, via a network interface device, with at least one database system having therein at least one database containing manufacturing operation data about a manufacturing operation of a product; and
   importing, via the network interface device, the manufacturing operation data from the at least one database to a local storage device;
   identifying, within the manufacturing operation data:
      a plurality of inventory locations associated with the manufacturing operation; and
      a plurality of components stored at each of the inventory locations that are used in manufacturing the product;
   retrieving, from the manufacturing operation data:
      a current component inventory and space data, the current component inventory and space data containing a current inventory quantity and space occupied for each of the plurality of components at each of the plurality of inventory locations; and
      a historical component usage data, the historical component usage data indicating a magnitude of a historical consumption of the component during a first time period for each of the plurality of components at each of the plurality of inventory locations;
   retrieving, for each of the plurality of components, at least one demand forecast which indicates, for each of the plurality of components, a magnitude of future component usage during a second time period;
   calculating, based on the current component inventory and space data, the historical component usage data, and the demand forecast, a target inventory level range for each of the plurality of components at each of the plurality of inventory locations;
   receiving, via an input device of the data processing system, a selection of at least one selected component from among the plurality of components and at least one selected inventory location from among the plurality of inventory locations;
   in response to receiving the selection:
      generating, by the processor, at least one inventory level control chart that depicts a number of the at least one selected component at the at least one selected inventory location during a plurality of time periods; and
      displaying the at least one inventory level control chart on a display device communicably coupled to the processor;
   retrieving, from the manufacturing data:
      inventory location information for each of the plurality of inventory locations; and
      a component space usage for each component;
   calculating a percent occupancy for each inventory location based on the inventory location information and the component space usage, wherein the percent occupancy of an inventory location identifies a percentage of a total space that is occupied by all components at that location;
   generating at least one space control chart for the at least one selected inventory location based on the percent occupancy, wherein the at least one space control chart identifies the percent occupancy for the selected inventory location; and
   displaying the at least one space control chart on the display device;
   wherein the at least one inventory level control chart and the at least one space control chart are used to determine optimal inventory levels of the plurality of components that would not disrupt manufacturing operations of the product and minimize a cost of holding the plurality of components within the plurality of inventory locations.

2. The method of claim 1, further comprising:
   retrieving, from the manufacturing operation data, component demand data for each of the plurality of components; and
   calculating the demand forecast of each of the components for each of the inventory locations based on the component demand data.

3. The method of claim 1, further comprising:
   generating, based on the at least one inventory level control chart and the at least one space control chart, at least one inventory and space relationship chart for each of the inventory locations, wherein the at least one inventory and space relationship chart classifies a current inventory and occupancy for each inventory location; and
   displaying the at least one inventory and space relationship chart on the display device.

4. The method of claim 1, wherein calculating the target inventory level range for each of the components at each of the inventory locations further comprises:
   calculating a first upper control limit zone;
   calculating a second upper control limit zone;
   calculating a first lower control limit zone; and
   calculating a second lower control limit zone;
   wherein the upper control limit zones and lower control limit zones are calculated based on: a current inventory level, a mean demand, a standard deviation of the mean demand, and a net lead time.

5. A data processing system comprising:
   a local storage device;
   a display device;
   a network interface device communicably connected to at least one database system having therein at least one database containing manufacturing operation data about a manufacturing operation of a product and which imports the manufacturing operation data to the local storage device;

at least one processor coupled to the local storage device, the display device, and the network interface device that:
  identifies, within the manufacturing operation data:
    a plurality of inventory locations associated with the manufacturing operation; and
    a plurality of components stored at each of the inventory locations that are used in manufacturing the product;
  retrieves, from the manufacturing operation data:
    a current component inventory and space data, the current component inventory and space data containing a current inventory quantity and space occupied for each of the plurality of components at each of the plurality of inventory locations; and
    a historical component usage data, the historical component usage data indicating a magnitude of a historical consumption of the component during a first time period for each of the plurality of components at each of the plurality of inventory locations;
  retrieve at least one demand forecast for each of the plurality of components, wherein a demand forecast indicates, for the components, a magnitude of future component usage of a corresponding component during a second time period; and
  calculates, based on the current component inventory and space data, the historical component usage data, and the demand forecast, a target inventory level range for each of the plurality of components at each of the plurality of inventory locations; and
at least one input device coupled to the at least one processor that receives a selection of at least one selected component from among the plurality of components and at least one selected inventory location from among the plurality of inventory locations;
wherein:
  the at least one processor in response to receiving the selection, generates at least one inventory level control chart that depicts a number of the at least one selected component at the at least one selected inventory location during a plurality of time periods;
  display device displays the at least one inventory level control chart;
  the at least one processor:
    retrieves, from the manufacturing operation data:
      inventory location information for each of the plurality of inventory locations; and
      a component space usage for each component;
    calculates a percent occupancy for each inventory location based on the inventory location information and the component space usage, wherein the percent occupancy of an inventory location identifies a percentage of a total space that is occupied by all components at that location; and
    generates at least one space control chart for the at least one selected inventory location based on the percent occupancy, wherein the at least one space control chart identifies the percent occupancy for the selected inventory location; and
  the display device displays the at least one space control chart; and
wherein the at least one inventory level control chart and the at least one space control chart are used to determine optimal inventory levels of the plurality of components that would not disrupt manufacturing operations of the product and minimize a cost of holding the plurality of components within the plurality of inventory locations.

6. The data processing system of claim 5, wherein the at least one processor:
  retrieves, from the manufacturing operation data, component demand data for each of the plurality of components; and
  calculates the demand forecast of each of the components for each of the inventory locations based on the component demand data.

7. The data processing system of claim 5, wherein:
  the at least one processor generates, based on the at least one inventory level control chart and the at least one space control chart, at least one inventory and space relationship chart for each of the inventory locations, wherein the at least one inventory and space relationship chart classifies a current inventory and occupancy for each inventory location; and
  the display device displays the at least one the inventory and space relationship chart based on the inventory level control chart and the space control chart.

8. The data processing system of claim 5, wherein:
  in calculating the target inventory level range for each of the components at each of the inventory locations, the at least one processor calculates:
    a first upper control limit zone;
    a second upper control limit zone;
    a first lower control limit zone; and
    a forth lower control limit zone; and
  the upper control limit zones and lower control limit zones are calculated based on: a current inventory level, a mean demand, a standard deviation of the mean demand, and a net lead time.

9. The data processing system of claim 8, wherein the control limit zones are calculated based on:
  a current inventory level;
  a mean demand;
  a standard deviation of the mean demand; and
  a net lead time.

10. A computer program product comprising:
  a computer readable storage device; and
  program code on the computer readable storage device that when executed within a processor provides the functionality of:
    communicating, via a network interface device, with at least one database system having therein at least one database containing manufacturing operation data associated with a manufacturing operation of a-product and importing the manufacturing operation data to a local storage device;
    identifying, within the manufacturing operation data:
      a plurality of inventory locations associated with the manufacturing operation; and
      a plurality of components stored at each of the inventory locations that are used in manufacturing the product;
    retrieving, from the manufacturing operation data:
      a current component inventory and space data, the current component inventory and space data containing a current inventory quantity and space occupied for each of the plurality of components at each of the plurality of inventory locations;
      a historical component usage data, the historical component usage data indicating a magnitude of a historical consumption of the component during a first time period for each of the plurality of components at each of the plurality of inventory locations; and retrieving, for each of the plurality of components, at least one demand forecast, which indicates for each of the plurality of components a magnitude of future component usage during a second time period;

calculating, based on the current component inventory and space data, the historical component usage data, and the demand forecast, a target inventory level range for each of the plurality of components at each of the plurality of inventory locations;

receiving, via an input device, a selection of at least one selected component from among the plurality of components and at least one selected inventory location from among the plurality of inventory locations;

in response to receiving the selection:
generating at least one inventory level control chart that depicts a number of the at least one selected component at the at least one selected inventory location during a plurality of time periods; and
displaying the at least one inventory level control chart on a display retrieving, from the manufacturing operation data:
inventory location information for each of the plurality of inventory locations; and
a component space usage for each component;
calculating a percent occupancy for each inventory location based on the inventory location information and the component space usage, wherein the percent occupancy of an inventory location identifies a percentage of a total space that is occupied by all components at that location;
generating at least one space control chart for the at least one selected inventory location based on the percent occupancy, wherein the at least one space control chart identifies the percent occupancy for the selected inventory location; and
displaying the at least one space control chart on the display;

wherein the at least one inventory level control chart and the at least one space control chart are used to determine optimal inventory levels of the plurality of components that would not disrupt manufacturing operations of the product and minimize a cost of holding the plurality of components within the plurality of inventory locations.

11. The computer program product of claim 10, further comprising program code on the computer readable storage device that when executed within the processor provides the functionality of:
retrieving, from the manufacturing operation data, component demand data for each of the plurality of components; and
calculating the demand forecast of each of the components for each of the inventory locations based on the component demand data.

12. The computer program product of claim 10, further comprising program code on the computer readable storage device that when executed within the processor provides the functionality of:
generating, based on the at least one inventory level control chart and the at least one space control chart, at least one inventory and space relationship chart for each of the inventory locations, wherein the at least one inventory and space relationship chart classifies a current inventory and occupancy for each inventory location; and
displaying the at least one inventory and space relationship chart on the display device.

13. The computer program product of claim 10, wherein the program code for calculating the target inventory level range for each of the components at each of the inventory locations further comprises program code that enables the processor to provide the functionality of:
calculating a first upper control limit zone;
calculating a second upper control limit zone;
calculating a first lower control limit zone; and
calculating a second lower control limit zone;
wherein the upper control limit zones and lower control limit zones are calculated based on: a current inventory level, a mean demand, a standard deviation of the mean demand, and a net lead time.

14. The method of claim 2, wherein the demand forecast is calculated based on the component demand data, a component demand of at least one sister location, and the current inventory quantity at each of the plurality of inventory locations.

15. The method of claim 14, further comprising:
determining whether a portion of the second time period coincides with a particular time period;
in response to determining a portion of the second time period coincides with the particular time period, moving a current demand associated with the at least one component to a first portion of time within a third time period;
calculating a total demand for each of the plurality of components in the second time period; and
subtracting, for each of the plurality of components, the current inventory quantity from the total demand to determine a net demand;
wherein the demand forecast is calculated based on the net demand.

16. The data processing system of claim 6, wherein the demand forecast is calculated based on the component demand data, a component demand of at least one sister location, and the current inventory quantity at each of the plurality of inventory locations.

17. The data processing system of claim 16, wherein the processor:
determines whether a portion of the second time period coincides with a particular time period;
in response to determining a portion of the second time period coincides with the particular time period, moves a current demand associated with the at least one component to a first portion of time within a third time period;
calculates a total demand for each of the plurality of components in the second time period; and
subtracts, for each of the plurality of components, the current inventory quantity from the total demand to determine a net demand;
wherein the demand forecast is calculated based on the net demand.

18. The method of claim 1, wherein:
importing the manufacturing operation data from the at least one database to the local storage device further comprises, importing, via the network interface device:
a first manufacturing operations data from a central planning system;
a second manufacturing operations data from an enterprise resource planning system; and a third manufacturing operations data from a manufacturing floor system;

the first manufacturing operations data, the second manufacturing operations data, and the third manufacturing operations data are stored in the local storage device as the manufacturing operation data.

19. The data processing system of claim 5, wherein:
in importing the manufacturing operation data to the local storage device, the network interface device imports:
- a first manufacturing operations data from a central planning system;
- a second manufacturing operations data from an enterprise resource planning system; and
- a third manufacturing operations data from a manufacturing floor system;

the first manufacturing operations data, the second manufacturing operations data, and the third manufacturing operations data are stored in the local storage device as the manufacturing operation data.

20. The computer program product of claim 10, wherein:
importing the manufacturing operation data from the at least one database to the local storage device further comprises, importing, via the network interface device:
- a first manufacturing operations data from a central planning system;
- a second manufacturing operations data from an enterprise resource planning system; and
- a third manufacturing operations data from a manufacturing floor system;

the first manufacturing operations data, the second manufacturing operations data, and the third manufacturing operations data are stored in the local storage device as the manufacturing operation data.

\* \* \* \* \*